(12) United States Patent
Bergsagel et al.

(10) Patent No.: US 10,395,541 B2
(45) Date of Patent: Aug. 27, 2019

(54) INTEGRATED FAULT-TOLERANT AUGMENTED AREA VIEWING SYSTEM

(71) Applicant: Texas Instruments Incorporated, Dallas, TX (US)

(72) Inventors: Jonathan Elliot Bergsagel, Richardson, TX (US); Sunita Nadampalli, McKinney, TX (US); Thomas Ray Shelburne, South Lyon, MI (US); Aishwarya Dubey, Plano, TX (US); Ian Carl Byers, Northville, MI (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 625 days.

(21) Appl. No.: 14/874,112

(22) Filed: Oct. 2, 2015

(65) Prior Publication Data

US 2016/0210861 A1 Jul. 21, 2016

Related U.S. Application Data

(60) Provisional application No. 62/104,475, filed on Jan. 16, 2015.

(51) Int. Cl.
| | |
|---|---|
| *B60R 16/00* | (2006.01) |
| *G08G 1/16* | (2006.01) |
| *B60R 1/00* | (2006.01) |
| *B60Q 9/00* | (2006.01) |

(52) U.S. Cl.
CPC ............. *G08G 1/167* (2013.01); *B60Q 9/008* (2013.01); *B60R 1/00* (2013.01); *B60R 2300/404* (2013.01); *B60R 2300/70* (2013.01)

(58) Field of Classification Search
CPC . B60R 1/00; B60R 2300/70; B60R 2300/404; B60Q 9/008; G08G 1/167
See application file for complete search history.

(56) References Cited

U.S. PATENT DOCUMENTS

| | | | | |
|---|---|---|---|---|
| 4,380,047 A | * | 4/1983 | Eisenhard | G06F 3/0601 386/206 |
| 4,649,384 A | * | 3/1987 | Sheafor | G06F 13/124 370/216 |
| 4,953,930 A | * | 9/1990 | Ramsey | G02B 6/43 385/14 |

(Continued)

FOREIGN PATENT DOCUMENTS

GB 2345830 * 7/2000

*Primary Examiner* — Sathyanaraya V Perungavoor
*Assistant Examiner* — Philip P. Dang
(74) *Attorney, Agent, or Firm* — Michael A. Davis, Jr.; Charles A. Brill; Frank D. Cimino

(57) ABSTRACT

An integrated fault-tolerant augmented area viewing system includes, for example, a subsystem processor for receiving a safety signal for blind spot monitoring from a blind spot sensor and for generating a subsystem processor video output signal in response to the received safety signal. Selector circuitry selects the subsystem processor video output signal or a master controller video output signal received from a master controller and generates a selected video output signal in response. The selector circuitry performs the selection of the video output signal selection in response to receiving a safety request signal generated in response to a user action. A buffer outputs the selected video output signal for displaying on a display for viewing by the user.

20 Claims, 4 Drawing Sheets

(56) References Cited

U.S. PATENT DOCUMENTS

| | | | | |
|---|---|---|---|---|
| 5,309,443 | A * | 5/1994 | Schorman | H04B 14/068 375/351 |
| 5,383,202 | A * | 1/1995 | Edgar | G10L 19/005 375/254 |
| 5,806,072 | A * | 9/1998 | Kuba | H04N 1/2112 |
| 5,815,507 | A * | 9/1998 | Vinggaard | H03M 13/00 714/704 |
| 6,298,084 | B1 * | 10/2001 | Vinggaard | H04L 1/005 375/224 |
| 6,438,275 | B1 * | 8/2002 | Martins | H04N 19/503 345/606 |
| 6,965,395 | B1 * | 11/2005 | Neter | H04N 5/3675 348/129 |
| 7,579,939 | B2 * | 8/2009 | Schofield | B60C 23/00 340/425.5 |
| 7,800,089 | B2 * | 9/2010 | Burke | B41J 2/2142 250/202 |
| 8,017,898 | B2 * | 9/2011 | Lu | B60Q 1/1423 250/208.1 |
| 8,251,478 | B2 * | 8/2012 | Shi | B41J 29/393 347/16 |
| 8,291,001 | B2 * | 10/2012 | Burke | B41J 2/1753 347/105 |
| 8,788,549 | B2 * | 7/2014 | Padaki | G06F 7/483 708/208 |
| 2006/0119473 | A1 * | 6/2006 | Gunderson | B60Q 9/006 340/435 |
| 2013/0282267 | A1 * | 10/2013 | Rubin | G08G 9/02 701/301 |
| 2014/0201330 | A1 * | 7/2014 | Lozano Lopez | H04L 41/5067 709/219 |
| 2014/0253570 | A1 * | 9/2014 | Tripathi | G06T 1/60 345/531 |
| 2014/0267688 | A1 * | 9/2014 | Aich | H04N 7/181 348/113 |

\* cited by examiner

US 10,395,541 B2

INTEGRATED FAULT-TOLERANT AUGMENTED AREA VIEWING SYSTEM

CLAIM OF PRIORITY

This application for Patent claims priority to U.S. Provisional Application No. 62/104,475 entitled "FAULT-TOLERANT REAR-VIEW CAMERA INTEGRATED IN AN AUTOMOTIVE INFOTAINMENT SYSTEM" filed Jan. 16, 2015 in the United States Patent and Trademark Office, wherein the application listed above is hereby fully incorporated by reference herein for all purposes.

BACKGROUND

Electronic viewing systems are being integrated into increasingly larger numbers of applications. Such applications include displays for providing additional situational awareness to operators of moving vehicles. The displays often include a panel for displaying an image of an area for surveillance by a sensor such as a camera, transducer, laser, and the like, which is affixed to a moving vehicle for monitoring blind spots (e.g., that are "blind" with respect to the operator). The sensor generates an imaging signal (e.g., in response to electromagnetic or sound waves impinging the sensor) that contains (e.g., ranging or visual) information of the surveilled area. The imaging signal is used to generate a (e.g., two- or "three-" dimensional) image for display on the panel such that the display user (e.g., vehicle operator) has increased situational awareness, which normally results in an increased level of safety of operation of the vehicle. However, as such viewing systems are increasingly relied upon, a failure of such a system can instead result in decreased safety in the operation of a vehicle when the failed system is relied upon to operate the vehicle.

SUMMARY

The problems noted above can be addressed in an integrated fault-tolerant augmented area viewing system that includes, for example, a subsystem processor for receiving a safety signal for blind spot monitoring from a blind spot sensor and for generating a subsystem processor video output signal in response to the received safety signal. Selector circuitry selects the subsystem processor video output signal or a master controller video output signal received from a master controller and generates a selected video output signal in response. The selector circuitry performs the selection of the video output signal selection in response to receiving a safety request signal generated in response to a user action. A buffer outputs the selected video output signal for displaying on a display for viewing by the user.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a subsystem of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "mode" can mean a particular architecture, configuration (including electronically configured configurations), arrangement, application, and the like, for accomplishing a purpose. The term "processor" can mean a circuit for processing, a state machine and the like for execution of programmed instructions for transforming the processor into a special-purpose machine, circuit resources used for the processing, and combinations thereof.

Figure 1:
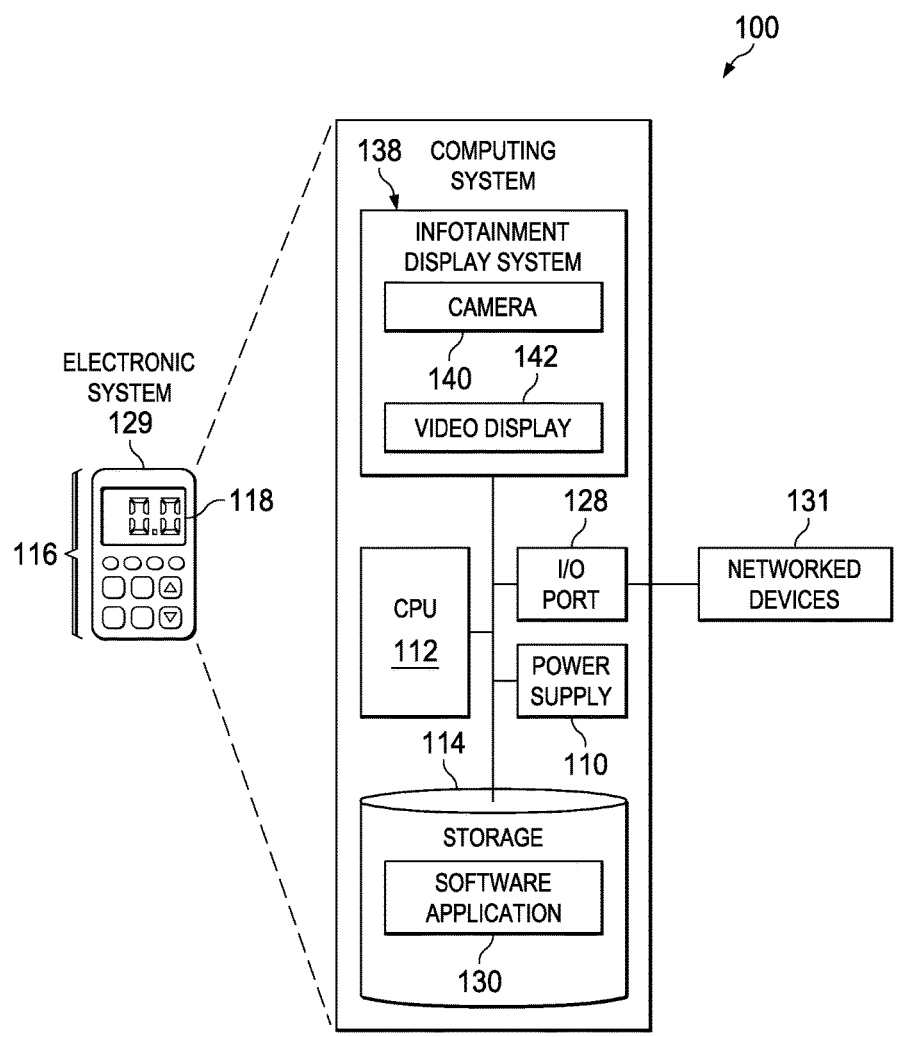
FIG. 1 shows an illustrative electronic device in accordance with example embodiments of the disclosure.

FIG. 1 shows an illustrative computing system 100 in accordance with certain embodiments of the disclosure. For example, the computing system 100 is, or is incorporated into, an electronic system 129, such as a computer, electronics control "box" or display, communications equipment (including transmitters), or any other type of electronic system arranged to generate electrical signals.

In some embodiments, the computing system 100 comprises a megacell or a system-on-chip (SoC) which includes at least one processor such as a CPU (Central Processing Unit) 112 (which can include multiple sub-processors), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores instructions for one or more software applications 130 (e.g., embedded applications)

that, when executed by the CPU 112, perform any suitable function associated with the computing system 100.

The CPU 112 comprises memory and logic circuits that store information frequently accessed from the storage 114. The computing system 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface operable to receive input from (and/or provide output to) networked devices 131. The networked devices 131 can include any device capable of point-to-point and/or networked communications with the computing system 100. The computing system 100 can also be coupled to peripherals and/or computing devices, including tangible, non-transitory media (such as flash memory) and/or cabled or wireless media. These and other input and output devices are selectively coupled to the computing system 100 by external devices using wireless or cabled connections. The storage 114 can be accessed by, for example, by the networked devices 131.

The CPU 112 is coupled to I/O (Input-Output) port 128, which provides an interface operable to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing system 100 by external devices using or cabled connections. The CPU 112, storage 114, and power supply 110 can be coupled to an external power supply (not shown) or coupled to a local power source (such as a battery, solar cell, alternator, inductive field, fuel cell, capacitor, and the like).

The computing system 100 includes an infotainment display system 138 (e.g., as a system and/or subsystem). The infotainment display system 138 typically includes a sensor (such as a camera 140) and a display (such as video display 142). The sensor is suitable for generating a signal for conveying the information detected by the sensor. The display is suitable for displaying an image generated in response to the information received by the sensor.

A portion of the infotainment display system 138 can be implemented as an integrated circuit, which is physically spaced apart from sensor (e.g., camera) 140 and/or display 142. For example, the CPU 120 can be embodied as an SoC in the chassis of infotainment display system 138, while the camera 140 can be located at a location for providing a video image of a hard-to-see location such as a rear-view and/or a rearwards side-view of the vehicle. The camera 140 is typically coupled to the SoC using wired connections. One or more cameras 140 can be used (e.g., such that one or more images is simultaneously displayed on the display 142).

The infotainment display system 138 is typically arranged to selectively present a video image (e.g., including moving or still video images) where the displayed image is selected from a plurality of applications having a display interface. The applications can include sound system interfacing, personal electronic device interfacing, navigation system interfacing, a safety-related camera display system, and the like).

The applications can be selected in response to an operator activating (e.g., hard or "soft") buttons associated with the infotainment display system 138, or can be selected in response to an operator actuating a control of a vehicle in which the infotainment display system 138 is integrated. For example, putting the gearshift lever into the "reverse" position (e.g., automatically) selects the rear-view camera display system such that an image from the rear-view camera is displayed on the display 142 of the infotainment system 138. Accordingly, the operator, by viewing the display, is better apprised of the current safety (and/or relative lack thereof) situation behind both the operator and the vehicle.

However, the increased integration of the various applications on conventional infotainment systems might increase the likelihood of a system "crash" (e.g., such as a crash caused by an error in the execution of the infotainment operating system from which the operating system does not quickly recover). Such a crash can result, for example, in the continuous video images from the safety-related camera display system not being displayed for the benefit of the operator of the vehicle serviced by the infotainment display system 138.

As disclosed herein, the architecture of the infotainment display system 138 helps ensure safe and continuous operation of the integrated fault-tolerant augmented area viewing system, for example, even in the event when the operating system of the infotainment display system 138 crashes. In an embodiment, a rear-view camera subsystem of the integrated fault-tolerant augmented area viewing system is formed on the same silicon substrate (e.g., on the same SoC device) in which a master controller (e.g., processor) of the infotainment display system 138 is also formed. Such integration reduces costs and reduces the incidence of system crashes because, for example, the SoC device does not necessarily rely on other external chips to process a received safety signal (e.g., camera output video signal) and to provide a selected safety video signal to the display.

In an embodiment, the augmented area safety video system is implemented as a rear-view camera (RVC) coupled to an independent (e.g., operates functionally independently of the master controller) subsystem in the same SoC device. The RVC functionality includes additional fault-tolerant mechanisms that enable the RVC system to continue normal operation, for example, even after a main processor subsystem executing other applications has crashed. An embodiment of a fault-tolerant architecture of the infotainment display system 138 for providing robust operation of the RVC system is described with respect to FIG. 2.

Figure 2:
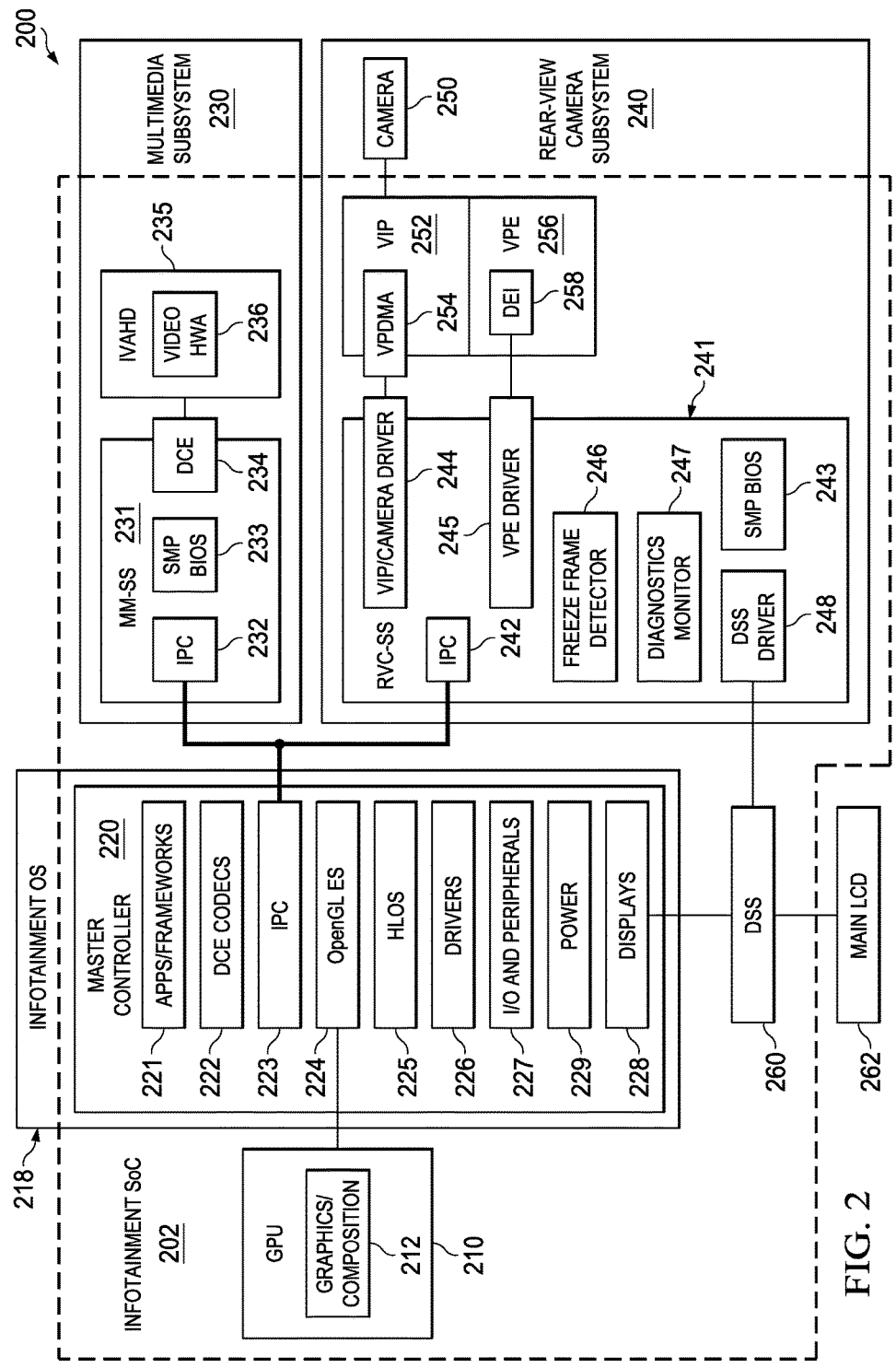
FIG. 2 is a block diagram illustrating an integrated fault-tolerant augmented area viewing system in accordance with embodiments of the disclosure.

FIG. 2 is a block diagram illustrating an integrated fault-tolerant augmented area viewing system 200 in accordance with embodiments of the disclosure. The augmented area viewing system, for example, is (or is included within) the infotainment display system 138 system. Generally described, the augmented area viewing system 200 receives safety information extracted from an (initially, at least) analog-generated input signal from a sensor and, in response, robustly generates safety information to be presented to a user. For example, the safety information can be a video image extracted from a sensor such as camera 250 and displayed using a display 262 such as a main LCD (liquid crystal display), where additional displays are optional.

The augmented area viewing system 200 includes a GPU (graphics processor unit) 210, master controller 220, multimedia subsystem (MM-SS) 230, a rear-view camera subsystem (RVC-SS) 240, and a display signal selector 260.

Substantial portions of the GPU 210, master controller 220, multimedia subsystem (MM-SS) 230, a rear-view camera subsystem (RVC-SS) 240, and a display signal selector 260 are formed (e.g., integrated) on the substrate of the infotainment SoC 202. The integration of the major systems on a single substrate, for example, reduces costs and increases reliability.

The GPU 210 is a graphics engine suitable for executing graphics instructions for composing video frames for a video signal (e.g., for displaying a moving image on a display). The graphics instructions are typically organized as routines within graphics/composition 212 toolbox of the GPU 210. The GPU 210 offloads video generation processing tasks from the master controller 220 to increase overall performance. For example, the master controller 220 includes an open graphics language embedded system (OpenGL ES) 224 for generating various graphics commands for sending to the GPU 210 for execution.

The master controller 220 includes the infotainment OS 218. The infotainment OS 218 is the high-level operating system (HLOS) operable to provide high-level (e.g., master) control of the major components (e.g., the GPU 210, the master controller 220, multimedia subsystem 230, a rear-view camera subsystem 240, and the display signal selector 260) of the augmented area viewing system 200. The master controller 220 is responsible for booting the infotainment OS 218. Accordingly, the master controller 220 is subject to operating erroneously (or not operating at all) in response to a crash of the infotainment OS 218, for example. In such conditions, any video content (e.g., content of video frames for display) generated by the master controller 220 is not properly monitored and/or controlled (e.g., which decreases safety when associated devices are otherwise being relied upon for purposes of safety). Instructions for executing the infotainment OS 218 are typically stored in memory (e.g., as HLOS 225).

The master controller 220 is operable to execute applications ("apps") and to provide frameworks for executing applications as provided in memory 221. The executed applications include decoding and encoding video signals using a distributed codec (coder/decoder) engine (DCE) 222. The DCE 222, for example, is operable to communicate with the multimedia subsystem 230 and the rear-view camera subsystem 240 via the inter-processor communication (IPC) 223, 232, and 242 (respectively) protocol stacks.

The master controller 220 includes drivers 226 suitable for interfacing with other components of the augmented area viewing system 200 including the input/output (I/O) and peripherals 227 and displays 228 interfaces.

The master controller 220 includes a power control 229 block for selectively applying power to the polls all various power domains of the augmented area viewing system 200 in accordance with various operating modes (including boot sequences, performance, power-saving, sleep modes, and the like).

As introduced above, the multimedia subsystem 230 is arranged to offload various processing tasks master controller 220. For example, multimedia subsystem 230 receives codec instructions via the IPC 232 and executes the received instructions on the distributed codec engine 234. The DCE 234 execution is accelerated using the image video accelerator high definition (IVAHD) 235 and the video hardware accelerator 236.

The multimedia subsystem 230 includes an array of one or more MM-SS processors 231. The array of one or more MM-SS processors 231 is often considered to as a "subprocessor" with respect to the master controller 220 because the array of one or more MM-SS processors 231 typically operates under the control of the master controller 220 (e.g., rather than controlling the "master" controller). The array of MM-SS processors 231 executes instructions in parallel such that the processing speed is increased. The array of one or more MM-SS processors 231 operates instructions stored in the SMP (symmetrical processor) BIOS (basic input/output system) 233. The array of one or more MM-SS processors 231 is often collectively referred to as a "processor" (e.g., because individual processors of the array often accomplishes a common task or common purpose of operation).

As introduced above, the rear-view camera subsystem 240 is arranged to communicate with the master controller 220 via the IPC 242 such that the rear-view camera subsystem 240 is substantially functionally (and/or operationally) isolated from the master controller 220 and other subsystems. The functional isolation provides robust operation of the rear-view camera subsystem 240 in the event of a system or component failure. While the rear-view camera subsystem 240 typically operates independently of the master controller 220, the rear-view camera subsystem 240 is operable to share messages and data with the master controller 220. In particular, the rear-view camera subsystem 240 is operable (e.g., independently of the master controller 220) to receive a video signal from the camera 250, to monitor the video signal for errors, and to generate a monitor video signal to be displayed to a user in response to the received video signal. In various embodiments, the rear-view camera subsystem 240 is operable to monitor the displayed monitor video signal to ensure the monitor video signal is being correctly displayed.

For example, after booting the augmented area viewing system 200, the rear-view camera subsystem 240 and the display signal selector 260 are operable to operate (e.g., in a vehicle backing up mode when a gearshift lever is in a "reverse" position) independently of the GPU 210, the master controller 220, and the multimedia subsystem 230. The independent operation of the rear-view camera subsystem 240 and the display signal selector 260, for example, helps ensure continuous and correct operation of the rear-view camera subsystem such that up-to-date and correct information is displayed on the display 262 even when the infotainment OS (operating system) 218 of the master controller 220 crashes.

In operation, camera 250 generates a video signal in response to light impinging analog sensor(s) of the camera 250. The video signal can (e.g., initially) be conveyed in analog or digital format; however the video signal still maintains analog noise even when the video signal is digitally encoded. For example, the video input processor (VIP) 252 is operable to receive the camera 250 video signal and to digitize and/or buffer the received video signal (where such digitization preserves a quantum of noise in the output digital signal). The video processor direct memory access (VPDMA) 254 controller is operable and to coordinate and automatically transfer the received buffered video signal to the camera driver 244 of the RVC-SS 241 processor array.

The video processing engine (VPE) 256 is operable to (e.g., re-) format and (e.g., signal-) process the received video signal. For example, the video processing engine 256 includes a de-interlacer (DEI) 258 for converting a raster-scanned image to a progressive scanned image. The video processing engine 256 can be programmed, written to, and read from using the VPE driver 245 of the RVC-SS 241 processor array.

The rear-view camera subsystem 240 includes the array of one or more MM-SS processors 241. The RVC-SS 241 processor array is considered to be a "subprocessor" with respect to the master controller 220. The RVC-SS 241 processor array typically executes instructions in parallel such that the processing speed is increased. The array of one or more MM-SS processors 231 operates instructions stored in the SMP (symmetrical processor) BIOS (basic input/output system) 243.

The RVC-SS 241 processor is operable to monitor the received video signal to determine whether, for example, a current video signal is present and/or being received correctly. For example, the freeze frame detector 246 is operable to analyze a portion (including, for example, the entire portion) of the video noise of each frame of a received video signal to determine whether a successive frame is the same as a previous frame (e.g., by relying upon the effects of noise in the frames). In various embodiments, the freeze frame detector 246 is operable to monitor the status of the display 262, for example, by examining successive frames read from the display buffer of the display 262.

When the successive frame is the same as a previous frame, an error is determined to exist, and a safety action is taken that is not necessarily reliant upon the proper operation of the master controller 220. The safety action includes actions such as displaying an easily noticed warning screen on the display, blanking the generated video for display, "flashing" the display, overlaying a warning signal graphic over frames derived from the camera 250, generating an error log entry, generating an audible warning signal, and the like. For example, the safety action results in a failed (or failing) component not being relied upon for the purpose of safety of operation.

The RVC-SS 241 processor includes diagnostic capability to ensure proper operation of the rear-view camera subsystem 240. The rear-view camera subsystem 240 includes a diagnostics monitor 247. The diagnostics monitor 247 is operable to monitor the proper operation of the rear-view camera subsystem 240 by testing components during a boot and/or monitoring the components during operation. The testing includes executing power-on self-tests and/or selectively executing tests selected in response to associated error conditions. The components of the RVC-SS 240 (such as the freeze frame detector 246) are monitored during operation (including normal operation and operation after an error indication has been received) to increase safety and enhance fault isolation.

The RVC-SS 240 includes the DSS (display signal selector) driver 248 for communicating with (and controlling) the DSS 260. The DSS driver 248 includes two-way communication capabilities for communicating with the DSS 260. For example, the DSS driver 248 is operable for sending a video signal (e.g., generated in response to the video received from the camera 250) from the RVC-SS 240 to the DSS 260. In a similar manner, the DSS driver is operable for receiving a "writeback" (discussed below with respect to FIG. 3) video signal from the DSS 260 (e.g., where the writeback video signal is generated by the display 262 in response to the displayed video signal and/or video signal buffer for the display).

The DSS 260 is operable to drive one or more displays such as the display 262 using a video from a selected one (or more) video sources such as the master controller 220 and the rear-view camera subsystem 240. For example, the DSS 260 is operable to drive the (e.g., main LCD) display using a video signal from the master controller 220 during operating conditions that are not safety-critical (e.g., during system boot time, when the associated vehicle is in park, neutral, or a forward drive position). The video signal from the master controller includes, for example, navigation information, tuning controls, environmental controls, and the like. When the associated vehicle is placed into an operating mode requiring enhanced safety (e.g., such as the gearshift lever being placed into "reverse" by an operator of the associated vehicle), the rear-view camera subsystem 240 directs (or verifies the accomplishment thereof, for example) the DSS 260 to display a video signal having frames generated in response to the video signal from the rear-view camera 250.

Any video signal contemporaneously generated by the master controller 220 is "preempted" (e.g., delegated to a lower viewing priority, including the priority of not being displayed at all) and the video signal generated by the rear-view camera subsystem 240 is (e.g., more prominently) displayed on the display 262 (e.g., instead of the master controller 220 video signal). In an embodiment, an (IPC) late-attach mechanism (which implements a handshake safety mechanism) is arranged to allocate DSS overlay pipes for the HLOS, and to reserve the display pipes for the RVC-SS that are reserved for performing the RVC function. In the embodiment, the RVC-SS 240 takes control over the DSS 260 configuration and all required display pipes when there is no HLOS response (e.g., that is expected and is instead missing) from the master controller.

In various embodiments, the rear-view camera system is adapted for other safety-critical applications such as monitoring other (e.g., auxiliary) "blind spots" such as when merging, changing lanes, performing security sweeps, and the like. For example, a turn signal (e.g., left or right turn) being activated (e.g., separately from or in conjunction with) causes video from an associated side-rear-view camera to be displayed on the display 262, on a portion of the display 262, on another display 262, or combinations thereof. The rear-view camera subsystem 240 is optionally hard-wired to receive an indication of a position detector of the gearshift lever (e.g., control) of the associated vehicle and is operable to detect and respond in a positioning of the gearshift lever (e.g., control) in various positions.

In another example, activation of the flasher (or other safety-related hard or soft) button causes video signals derived from a plurality of auxiliary blind spot cameras to be displayed on one or more display(s) 262. The auxiliary blind spots are monitored with safety-enhancing features (such as freeze frame detection, output monitoring, operational independence from the master controller 220, and other such features) using auxiliary-view camera systems similar to the rear-view camera subsystem 240. The auxiliary view camera systems are optionally hard-wired to safety controls (such as hard or software-defined buttons) of the associated vehicle and is operable to detect and respond to actuation of the safety controls.

Figure 3:
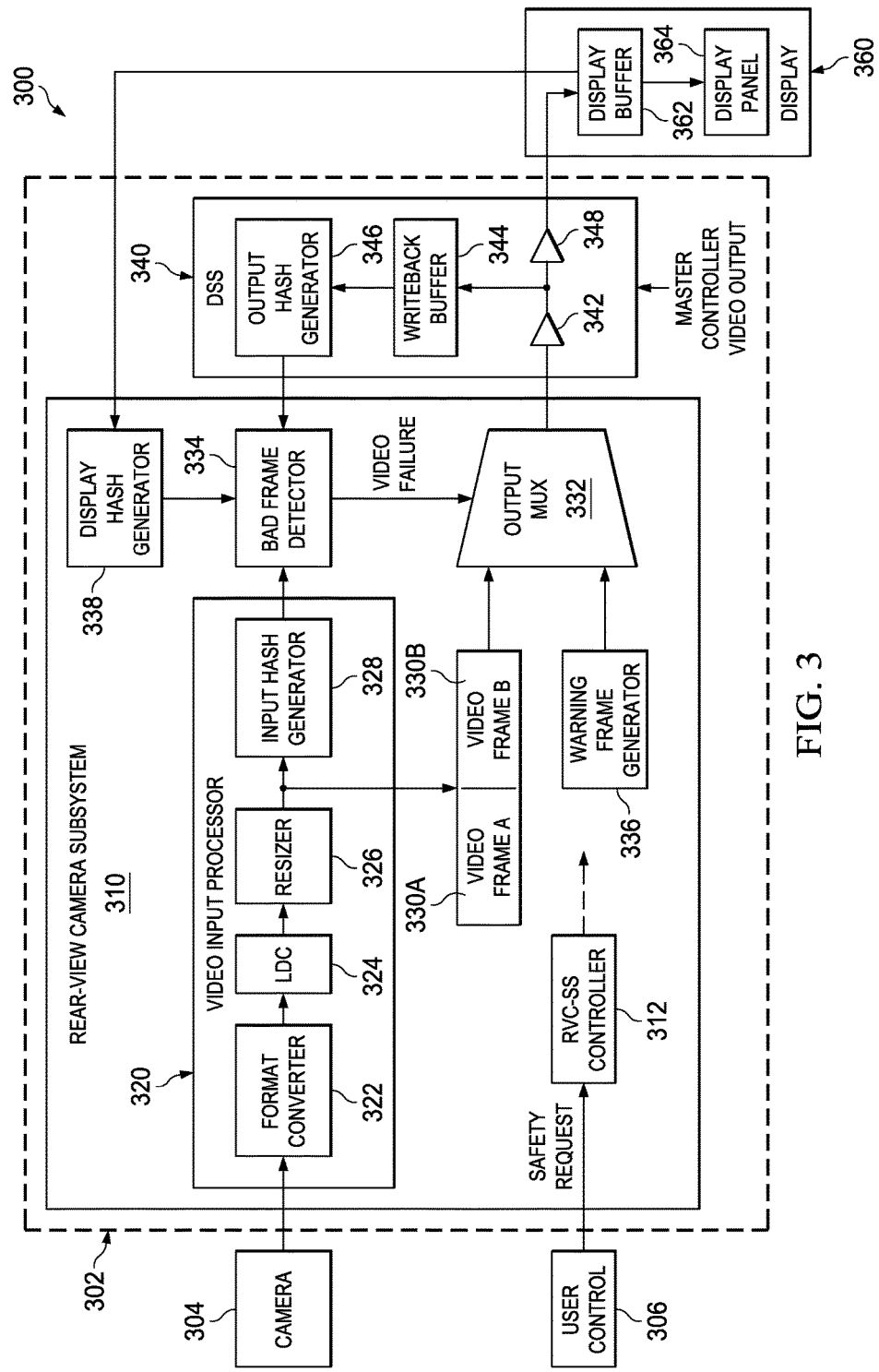
FIG. 3 is a block diagram illustrating an integrated fault-tolerant augmented area viewing subsystem 300 with multiple-source bad-frame detection in accordance with embodiments of the disclosure.

FIG. 3 is a block diagram illustrating an integrated fault-tolerant augmented area viewing subsystem 300 with multiple-source bad-frame detection in accordance with embodiments of the disclosure. The augmented area viewing subsystem 300, for example, is included with in the infotainment display system 138 system. The multiple-source bad-frame detection is operable, for example, to detect frozen frames and/or faults in writeback paths of selected video streams (which enhances resolution of fault isolation routines, for example).

The augmented area viewing subsystem 300 includes a blind spot sensor (e.g., camera) 304, a user control 306, a substrate 302 (upon which circuitry is formed), and display (s) 360. The augment are viewing subsystem is often installed, for example, in a vehicle to provide augmented views of areas that are considered to be "blind spots" with respect to the operator of the vehicle.

During the course of operation of the associated vehicle (e.g., the vehicle being controlled by the operator), the operator actuates (e.g., engages and/or disengages) at least one user control 306 that generates, for example, a safety signal for requesting extra safety (e.g., visibility) for augmenting the information (e.g., one or more viewing areas) available to the vehicle operator. Such control actuation includes, putting a gearshift lever of the associated vehicle into a "reverse" position, activating a turn signal to the left, activating a turn signal to the right, activating the "flasher" button, and the like. When the control is actuated, one or more camera views are selected that correspond to the control used and displayed (e.g., such that at least a left-rearwards view is selected in response to activating a left turn signal,). More than one view can be selected at a time for display using picture-in-picture technology and/or multiple displays (e.g., when the flasher button is actuated for activating a security sweep).

The RVC-SS controller 312 is operable (e.g., in addition to booting and controlling various modes of the RVC-SS 310) to receive the indication of the safety request generated by the user control 306. In response to the received safety request, the RVC-SS controller 312 directs the RVC-SS 310 to preempt any master controller video output signal and to generate video frames of the (e.g., rear-view) camera 304 for display on the display 360. In preempting any master controller video output signal, the RVC-SS controller 312 directs the DSS 340 to deprioritize (e.g., ignore) any video output signal from the master controller (e.g., master controller 220), and to prioritize (e.g., only display) a selected video (e.g., by output multiplexer 332) for display on display 360. Accordingly, safety of the operation of the vehicle is enhanced because the display of the (for example) rear-view camera (or warning frame, as discussed below) does not depend on a current operating state (including a crashed or rebooting state) of the master controller.

The circuitry formed on the substrate 302 includes a rear-view camera subsystem (RVC-SS) 310, an RVC-SS controller 312, and a display signal selector (DSS) 340. The integration of the RVC-SS 310 and the DSS 340 on a single substrate, for example, reduces costs. As discussed below, the multiple-source bad-frame detection provides video fault isolation that discriminates between on-substrate video faults and off-substrate video faults (including detection of faults in either off-substrate camera 304 video faults or off-substrate display 360 video faults).

The RVC-SS 310 includes a video input processor 320 for processing a camera video signal input from camera 304. The video input processor 320 includes a format converter 322 (e.g., to perform color space conversion), a lens distortion corrector 324 (e.g., to lessen "fish-eye" distortion), a resizer 326 (e.g., to convert frame sampling of the camera video signal to frame size(s) used internally by the RVC-SS 310), and an input hash generator 328 (e.g., to generate a digital signature of the resized input video signal). (A cyclical redundancy check generator can be used in place of the hash generator 328.) The format converter 322, the lens distortion corrector 324, and the resizer 326 are optional in accordance with configurations of various embodiments.

The resized input frames are alternately stored in frame buffers video frame A (330A) and video frame B (330B). The dual frame buffer architecture permits display of a first buffer while a second buffer is transferred and processed, for example. For simplicity, the dual frame buffer architecture (which is used in the circuitry in at least FIG. 3 for processing and displaying frames) is not always explicitly illustrated.

The output multiplexer (MUX) 332 is operable to select the (e.g.) next ready-to-display frame from one of the frame buffers 330A and 330B. In the event of a video error (e.g., where the display 360 is determined to not be displaying a faithful representation of the camera video signal by bad frame detector 334), the output multiplexer "preempts" the camera video signal stream, and outputs an alternative (e.g., warning) video stream generated, for example, by warning frame generator 336. The alternative video stream typically depicts a warning image that is readily and easily discernable from the "normal" displayed images of the camera-derived video signal. A warning image can depict (e.g., when displayed by display 360) a blank (e.g., black) screen, a flashing screen, a screen including a (e.g., overlaid) text warning, and the like. Accordingly, the output multiplexor is operable to generate the subsystem processor video output signal, wherein the content of the subsystem processor video output signal is determined in response to a determination of a video error (e.g., by the bad frame detector 334).

The DSS 340 (which is typically formed on the same substrate 302, but not necessarily) is operable to receive video output frames from the output multiplexer 332 via input buffer 342. The output of input buffer 342 is coupled to the output buffer 348 (e.g., for display on display 360). Accordingly, the DSS is operable to select one of the subsystem processor video output signal and a master controller video output signal received from the master controller, where the selection is performed in response to receiving a safety request signal generated in response to a user action. (The DSS 340 is illustrated as having selected the subsystem processor video output signal for display.) The DSS 340 is operable to output the subsystem processor video output signal for display independently of an operating state of the master controller For purposes of bad frame detection and/or fault isolation of video streams, the output of input buffer 342 is coupled to a "writeback" path. The writeback path includes the writeback buffer 344 and the output hash generator 346. The writeback path includes the writeback buffer 344 and the output hash generator 346 are typically formed in the DSS (e.g., to enhance fault isolation) but can be included within the RVC-SS 310. The writeback buffer 344 (e.g., which can be a dual frame buffer as described above) is operable to store a video frame (e.g., intended for display on display 360) such that the output hash generator 346 can generate a hash for describing the output video frame.

The hash generator 346 normally uses the same hashing algorithm as the input hash generator 328 and the display hash generator 338 such that identical frames can be identified by comparing hashes (each of which is associated with a respective hashed frame) of frames to be compared. For example, the DSS 340 writeback hashing mechanism verifies that a received frame (hashed by input hash generator 328) is properly output to the DSS 340 (which is hashed by output hash generator 346) by comparing (e.g., in the bad frame detector 334) the hash of the sent frame with the hash of the received frame. When the hashes are equal, the received frame is determined to have been successfully transferred to the DSS 340. When the hashes are not equal, the received frame is determined not to have been successfully transferred to the DSS 340.

When the received frame is determined not to have been successfully transferred to the DSS 340, the bad frame detector asserts a video failure signal, which directs the output mux 332 to suppress the frames derived from the camera and to present an alternate warning video signal (e.g., instead). The warning video output signal can be included as a portion (e.g., including the entire portion) of the subsystem processor video output signal in response to a detection of a bad frame in a video signal derived from the camera 304.

The display 360 includes a display buffer 362, which stores frames (e.g., using a dual frame architecture) for display on display panel 364 (e.g., which is visible to the operator of the associated vehicle). The display 360 include a writeback path that is similar to the writeback path of the DSS 340. The writeback path of the display 360 includes the display buffer 362 and the display hash generator 338. Accordingly, the writeback path of the display 360 is different from the writeback path of the DSS 340 because the writeback path of the display 360 includes a return portion of the path for receiving frame information (e.g., hash information and/or the frame itself) of selected video output signal frames displayed on the display. The display hash generator 338 is typically included within the RVC-SS 310, which for example allows publically available displays 360 to be chosen for a particular application. The display buffer 344 (e.g., which can be a dual frame buffer as described above) is operable to store the display video frame (e.g., received by the display 360 for display on the display 360) such that the display hash generator 338 can generate a hash for describing the display video frame.

The bad frame detector 334 is operable to compare output of the display hash generator 338 with the output of the input hash generator to determine whether the resized video frame has been properly received by the display 360. The bad frame detector 334 is operable to provide an indication whether a video stream fault occurs off-substrate or on-substrate. Off-substrate-versus-on-substrate fault isolation is possible by determining at which writeback path(s) a video frame error has been determined. Such fault isolation is useful for determining whether a cabling error is present or whether a module containing the RVC 310 and/or the DSS 340 is to be replaced, for example.

The bad frame detector 334 is (e.g., also) operable to perform freeze frame detection. As discussed above, each video frame generated by an analog sensor of a video camera uniquely contains noise such that no two successively generated (whether adjacently generated or not) frames are identical even when the camera is stationary and nothing moves within the field of vision of the camera. The bad frame detector 334 buffers, for example, hashes successively generated by the input hash generator 328.

Accordingly, a "bad frame" determination can be made when (for example) the same frame is repeatedly encountered (e.g., "frozen frames"), or a frame is encountered in a (e.g., digital) first video stream that does not correspond to a frame in a second video stream. For example, digital video streams derived from the same digital video stream in normal operation have corresponding frames (e.g., such as frames from the DSS 340 writeback path video stream that correspond with frames from the display 360 writeback path video stream).

In accordance with a selected video frame rate, a selected number of frames are buffered over a window of time (which is typically short enough not to be substantially noticeable by the operator of the associated vehicle). Buffered hash frames (e.g., generated by the input hash generator 328, the output hash generator 346, and/or the display hash generator 338) are compared by the bad frame detector to determine "if" and/or "how long" a same frame is presented. If the time window (and/or number of hashes) is exceeded by a duration indicated by a number of successive hashes that are equal, the bad frame detector asserts a video failure signal, which directs the output mux to suppress the frames derived from the camera and to present a (e.g., alternate) warning video output signal. Notwithstanding the independence of the operation of the augmented area viewing subsystem 300 from the master controller (e.g., master controller 220), the assertion of the video failure signal is optionally coupled to the master controller such that the master controller can log the error and/or display and/or sound other warnings to the operator of the associated vehicle.

Figure 4:
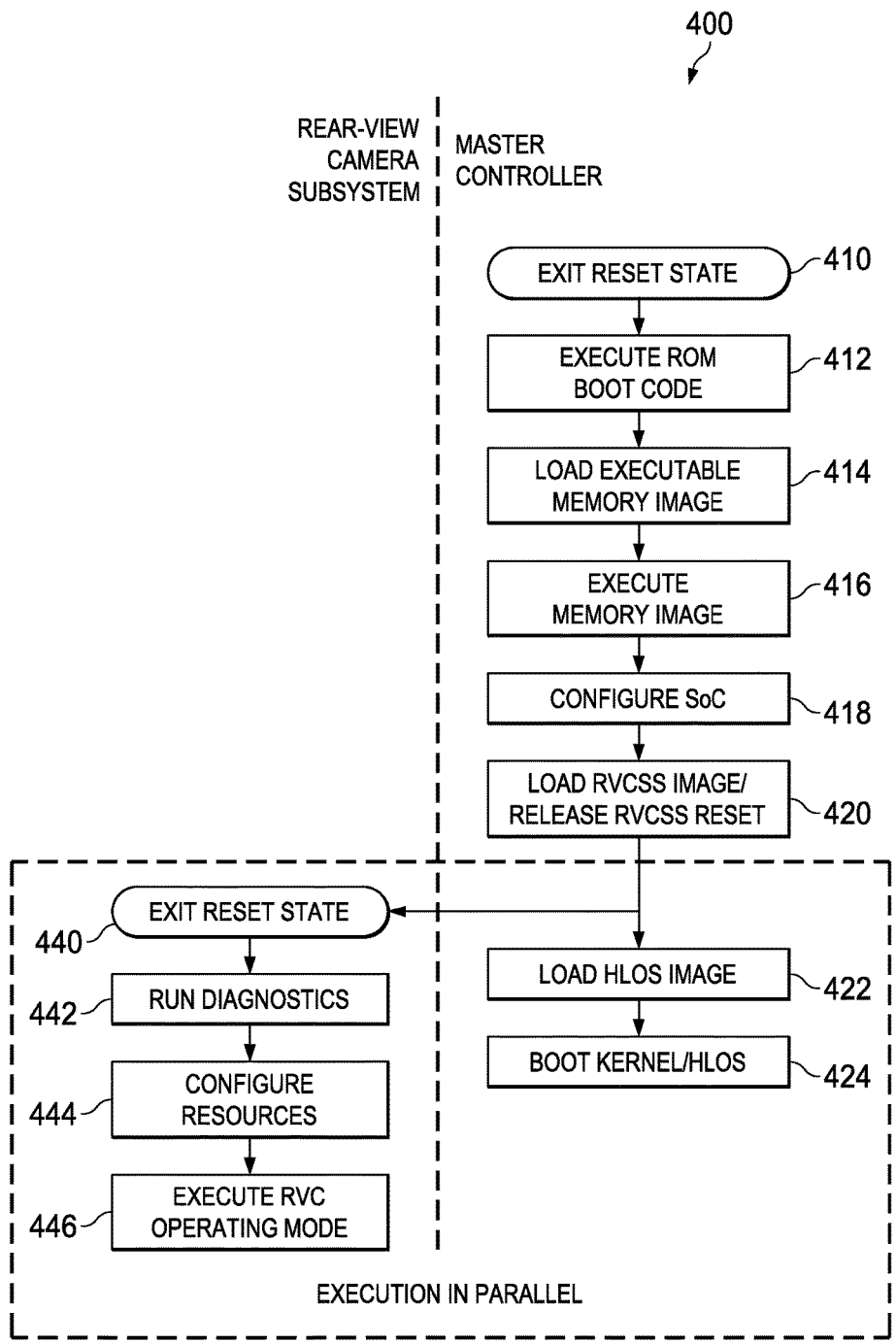
FIG. 4 is a flow diagram illustrating a boot sequence of an integrated fault-tolerant augmented area viewing system in accordance with embodiments of the disclosure.

FIG. 4 is a flow diagram illustrating a boot sequence of an integrated fault-tolerant augmented area viewing system in accordance with embodiments of the disclosure. The fault-tolerant augmented area viewing system includes a master controller processor (which typically controls high-complexity processes) and a rear-view camera subsystem (RVC-SS) processor (which typically controls lower-complexity processes and accordingly has a lower failure rate than the master controller processor).

Process flow 400 begins in operation 410 where the master controller of an integrated fault tolerant augmented area viewing system exits a reset state. For example, the reset state is typically exited upon the occurrence of application of power to the master controller and/or the releasing of a reset button. The process flow continues on operation 412.

In operation 412, the master controller executes a ROM boot sequence. For example, the ROM boot code includes instructions for performing low-level initialization routines for basic hardware resources such as digital phase lock loops (e.g., for generating a clock signal) and clocks (e.g., for distributing the clock signal to selected portions of circuitry). The process flow continues in operation 414.

In operation 414, an executable memory image is loaded in RAM. For example, the executable memory image includes code for operating the master controller in a normal operating mode. The executable memory image is normally loaded into closely coupled fast RAM for fast accesses of addressed code. The executable memory image can be authenticated, for example, to ascertain a level of trust in the executable memory image. The process flow continues in operation 416.

In operation 416, the master controller begins executing code stored in the above-mentioned executable memory image. For example, the master controller is operable to begin execution of instructions in the executable memory image loaded in operation 414, e.g., to prepare for the configuration process of operation 418. The process flow continues in operation 418.

In operation 418, the master controller configures resources of the SoC. For example, the master controller is operable to configure resources such as pin multiplexing, clock trees, DDR (double date rate) RAM, and the like. The process flow continues in operation 420.

In operation 420, the master controller loads an executable memory image for execution by the rear-view camera subsystem (RVC-SS) into RAM. For example, the master controller is operable to copy the executable memory image, perform basic configuration of the RVC-SS, and release the reset signal of the RVC-SS. The executable memory image includes a boot configuration for booting the RVC-SS.

The process flow continues in operation 422 for the master controller, while the process flow for the RVS-SS begins in operation 440. Operations 440, 442, 444, and 446 of the RVS-SS are performed in parallel with the operations 422 and 424 of the master controller as substantially independent processes (e.g., that are executed using different hardware processors).

In operation 422, the master controller loads a memory image of a high-level operating system (HLOS). For example, the master controller is operable to copy the image from a ROM (or flash memory) to a DDR RAM for fast access. The HLOS includes typical operating system components such a DTB (device tree blob for passing device information to the kernel), kernel, and the like. The process flow continues in operation 424.

In operation 424 the master controller boots the HLOS. For example, the master controller jumps to (e.g., initiates execution of instructions at) the kernel. The kernel initializes the HLOS and performs normal execution as the HLOS is progressively configured. The process flow for the master controller continues until operation of the HLOS is terminated (e.g., by a command or by a "crash").

In operation 440, the RVC-SS of an integrated fault tolerant augmented area viewing system exits a reset state. For example, the reset state is typically exited in response to operation 420 in which the master controller releases the RVC-SS reset signal. Accordingly, the RVC-SS is booted in parallel with the booting of the HLOS on the master controller processor. The parallel boot process of process flow 400 shortens the overall boot period that would otherwise be required where only one processor is used (e.g., by using dual cores or avoiding processor context switching penalties when using only one processor, for example). The shortened boot processes, for example, shortens the time required to display a rear-view image for backing a vehicle in reverse gear after starting the vehicle (where, for example, the vehicle starting typically starts the operation the integrated fault tolerant augmented area viewing system). The process flow continues in operation 442.

In operation 442, the RVC-SS executes diagnostic routines. For example, the RVC-SS starts to execute instructions loaded from the memory image loaded into RAM by the master controller. The executed instructions includes diagnostic routines for verifying proper operation of the RVC-SS. For purposes of troubleshooting, for example, the RVC-SS can communicate the result of diagnostic (and monitoring) routines to the master controller 220 via the IPC (inter-processor communication) protocol to ensure proper handshaking and levels of safety. The process flow continues in operation 444.

In operation 444, the RVC-SS configures resources of the RVC-SS. For example, the RVC-SS configures the sensor (e.g., rear-view camera), the VIP (video input processor), the VPE (video processing engine), the DSS (display signal selector), the bad frame detector, and the display. The RVC-SS run initial diagnostics to determine whether the RVC-SS is likely to operate without error in normal operation.

The resources of the RVC-SS typically operate in parallel and/or in conjunction with the processor of the RVC-SS such that resources and functionality are often distributed and/or shared between each other. For example, a determination that a bad frame has been detected can be made by the processor comparing digital signatures associated with respective frames. The digital signatures (in various embodiments) are hash results, which can be generated by a single, shared hash generator, multiple hash generators, and/or software executing upon the processor. Accordingly, a digital signature is associated with each frame that is to be inspected. The digital signatures of successive (e.g., not necessarily adjacent or sequential) frames to determine whether, for example, a successive frame is unique with respect to a previous frame against which the digital signatures are compared. When the selected resources are configured and initial diagnostic tests successfully run, the process flow continues in operation 446.

In operation 446, the RVC-SS executes the instructions for the RVC operating mode. For example, the RVC-SS starts to execute instructions causing the video stream to extend from the sensor (e.g., rear-view camera) to extend through the RVC-SS and the DSS, and to be displayed on the display. The RVC-SS is operable to monitor operation of the RVC-SS resources during operation to maintain a confidence in the proper operation of the monitored components. The RVC-SS maintains proper and timely operation (e.g., properly operating without additional delay and/or latency) even in the event of a crash or slowdown of the HLOS of the master controller (e.g., as a result of the lower complexity of the RVC-SS system).

When a non-correctable fault outside of the RVC-SS control, the RVC-SS is operable to detect the issue and take an appropriate action, which notifies the user. For example, The RVC-SS monitors successive frames to determine whether one or more "bad" (e.g., frozen and/or absent) frames are present (e.g., in incoming camera frames, frames processed on-substrate, and/or frames received from a final display output). When such an error (e.g., in various video frames) is detected, the RVC-SS outputs a warning video output signal (e.g., such as a "blank screen") to be displayed on the display. The instructions for the RVC operating modes include diagnostic routines for the various RVC-SS registers and vertical synchronization signals associated the RVC-SS peripherals. The process flow continues until normal shutdown (e.g., in response to a valid shutdown command) of the integrated fault-tolerant augmented area viewing system.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A circuit, comprising:
   a processor having a processor input and a processor output, the processor input adapted to be coupled to a blind spot sensor, the processor configured to: receive a safety signal from the blind spot sensor; and generate at the processor output a blind spot camera video output signal in response to the safety signal;
   an input hash generator having an input hash generator input and an input hash generator output, the input hash generator input coupled to the processor output, and the input hash generator configured to generate at the input hash generator output a first hash of the blind spot camera video output signal;
   selector circuitry coupled to the processor and adapted to be coupled to a controller, the selector circuitry configured to select a video output signal, the selected video output signal being either: the blind spot camera video output signal, if the safety signal is responsive to an action by a user; or otherwise a controller video output signal from the controller;
   a buffer having a buffer input and a buffer output, the buffer input coupled to the selector circuitry and adapted to be coupled to a display, the buffer configured to output at the buffer output the selected video output signal to the display for viewing by the user;

an output hash generator having an output hash generator input and an output hash generator output, the output hash generator input coupled to the buffer, and the output hash generator configured to generate at the output hash generator output a second hash of the selected video output signal; and a bad frame detector having a detector input, the detector input coupled to the input hash generator output and to the output hash generator output, the bad frame detector configured to compare the first and second hashes to detect a video fault.

2. The circuit of claim 1, wherein the blind spot sensor includes a video camera configured to generate a video input signal, the video input signal including video frames.

3. The circuit of claim 2, wherein the safety signal is asserted in response to the user actuating a control of a vehicle to which the video camera is affixed.

4. The circuit of claim 1, wherein the controller is formed upon a substrate upon which the processor is formed, and the controller is configured to configure a boot configuration of the processor.

5. The circuit of claim 1, wherein the bad frame detector is adapted to be coupled to the display, and the bad frame detector is configured to:
receive successive video frames from the display; and
detect bad frames by comparing digital signatures respectively associated with the successive video frames.

6. The circuit of claim 5, wherein the bad frame detector is configured to provide an indication of the video fault in response to at least one of: the video input signal, the blind spot camera video output signal, or the successive video frames received from the display.

7. The circuit of claim 5, wherein the bad frame detector is configured to provide an indication of whether the video fault occurs off-substrate or on-substrate.

8. The circuit of claim 1, further comprising a warning frame generator coupled to the bad frame detector, the warning frame generator configured to generate a warning video output signal as a portion of the blind spot camera video output signal, in response to the bad frame detector detecting a bad frame in a video signal derived from the blind spot sensor.

9. The circuit of claim 8, wherein the selector circuitry is configured to output the blind spot camera video output signal independently of an operating state of the controller.

10. A system, comprising:
a processor formed on a substrate, the processor having a processor input and a processor output, the processor input adapted to be coupled to a blind spot sensor, and the processor configured to: receive a safety signal from the blind spot sensor; and generate at the processor output a blind spot camera video output signal in response to the safety signal;
a controller, formed on the substrate, the controller configured to configure the processor;
an input hash generator having an input hash generator input and an input hash generator output, the input hash generator input coupled to the processor output, and the input hash generator configured to generate at the input hash generator output a first hash of the blind spot camera video output signal;
selector circuitry coupled to the processor and to the controller, the selector circuitry configured to select a video output signal, the selected video output signal being either: the blind spot camera video output signal, if the safety signal is responsive to an action by a user; or otherwise a controller video output signal from the controller;
a buffer having a buffer input and a buffer output, the buffer input coupled to the selector circuitry and adapted to be coupled to a display, the buffer configured to output at the buffer output the selected video output signal to the display for viewing by the user;
an output hash generator having an output hash generator input and an output hash generator output, the output hash generator input coupled to the buffer, and the output hash generator configured to generate at the output hash generator output a second hash of the selected video output signal; and
a bad frame detector having a detector input, the detector input coupled to the input hash generator output and to the output hash generator output, the bad frame detector configured to compare the first and second hashes to detect a video fault.

11. The system of claim 10, wherein the controller is configured to load a boot image for the processor.

12. The system of claim 11, wherein the selector circuitry is configured to output the blind spot camera video output signal independently of an operating state of the controller.

13. The system of claim 12, wherein the bad frame detector is configured to detect bad frames in a video input signal independently of the operating state of the controller.

14. A method, comprising:
receiving, by executing instructions with a processor formed on a substrate, a safety signal from a blind spot sensor;
generating, by executing instructions with the processor, a blind spot camera video output signal in response to the safety signal;
generating, by executing instructions with the processor, a first hash of the blind spot camera video output signal;
selecting, by executing instructions with the processor, a video output signal, the selected video output signal being either: the blind spot camera video output signal, if the safety signal is responsive to an action by a user; or otherwise a controller video output signal from a controller;
outputting, by executing instructions with the processor, the selected video output signal to a display for viewing by the user;
generating a second hash of the selected video output signal; and
comparing, by executing instructions with the processor, the first and second hashes to detect a video failure.

15. The method of claim 14, further comprising booting a high-level operating system (HLOS) on the controller in parallel with booting the processor for generating the blind spot camera video output signal.

16. The method of claim 15, further comprising generating a warning video output signal as a portion of the blind spot camera video output signal in response to a detection of a bad frame in a video signal derived from the blind spot sensor.

17. The method of claim 16, further comprising determining whether bad frames are detected in one of a first or a second writeback path of a video signal derived from the blind spot sensor, wherein the second writeback path is different from the first writeback path and includes a return portion to receive frame information of selected video output signal frames displayed on the display.

18. The circuit of claim 1, further comprising an output multiplexer configured to suppress the blind spot camera video output signal and to present an alternate warning video signal when the first hash and the second hash do not match.

19. The system of claim 10, further comprising an output multiplexer configured to suppress the blind spot camera video output signal and to present an alternate warning video signal when the first hash and the second hash do not match.

20. The method of claim 14, further comprising:
   suppressing the blind spot camera video output signal; and
   presenting an alternate warning video signal when the first hash and the second hash do not match.

\* \* \* \* \*